(12) United States Patent
Crombez

(10) Patent No.: US 9,889,834 B2
(45) Date of Patent: Feb. 13, 2018

(54) HYDRAULIC BRAKE ASSIST VACUUM MAINTENANCE SYSTEM AND METHOD

(75) Inventor: Dale Scott Crombez, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1160 days.

(21) Appl. No.: 13/171,988

(22) Filed: Jun. 29, 2011

(65) Prior Publication Data

US 2013/0000296 A1 Jan. 3, 2013

(51) Int. Cl.
| | |
|---|---|
| *B60T 13/52* | (2006.01) |
| *B60T 13/66* | (2006.01) |
| *B60T 17/02* | (2006.01) |
| *B60T 17/22* | (2006.01) |
| *F02N 11/08* | (2006.01) |

(52) U.S. Cl.
CPC ............ *B60T 13/52* (2013.01); *B60T 13/662* (2013.01); *B60T 17/02* (2013.01); *B60T 17/22* (2013.01); *F02N 11/084* (2013.01); *F02N 2200/0807* (2013.01); *F02N 2200/124* (2013.01); *Y02T 10/48* (2013.01)

(58) Field of Classification Search
None
See application file for complete search history.

(56) References Cited

U.S. PATENT DOCUMENTS

| | | | |
|---|---|---|---|
| 2,381,755 A * | 8/1945 | Jameson | ........................ 477/195 |
| 4,199,940 A | 4/1980 | Mathues | |
| 6,550,873 B1 * | 4/2003 | Hengler | .................. B60T 8/368 |
| | | | 303/116.4 |
| 2005/0004732 A1 * | 1/2005 | Berry | .................... B60W 10/06 |
| | | | 701/48 |
| 2009/0071147 A1 | 3/2009 | Wang et al. | |
| 2009/0230761 A1 * | 9/2009 | Sekiguchi | ............... B60T 8/442 |
| | | | 303/2 |
| 2013/0319561 A1 * | 12/2013 | Helbling | ............. F15B 13/0803 |
| | | | 137/884 |

* cited by examiner

*Primary Examiner* — Erin D Bishop
(74) *Attorney, Agent, or Firm* — David Kelley Esq.; Tung & Associates

(57) ABSTRACT

A hydraulic brake assist vacuum maintenance system includes a vacuum source, a vacuum booster/master cylinder interfacing with the vacuum source, a brake pedal interfacing with the vacuum booster/master cylinder, a brake control unit interfacing with the vacuum booster/master cylinder, wheel brakes interfacing with the brake control unit and a hydraulic brake assist interfacing with the brake control unit and adapted to hydraulically operate the wheel brakes upon reduction or cessation of vacuum pressure from the vacuum source to the vacuum booster/master cylinder.

19 Claims, 2 Drawing Sheets

HYDRAULIC BRAKE ASSIST VACUUM MAINTENANCE SYSTEM AND METHOD

FIELD

The disclosure generally relates to vehicle braking systems. More particularly, the disclosure relates to a hydraulic brake assist vacuum maintenance system and method which maintains vacuum pressure for braking using Hydraulic Brake Assist (HBA) during auto stop engine shutdown.

BACKGROUND

Modern vehicles are increasingly using an auto stop feature in which the vehicle engine is shut down to conserve fuel when the vehicle stops. During auto stop, vacuum pressure may not be available for operation of the vehicle brake system. If the vacuum level is low or becomes low while the engine is off, an expensive electric vacuum pump or engine startup may be necessary to achieve an adequate level of vacuum pressure for braking.

Accordingly, a hydraulic brake assist vacuum maintenance system and method which maintains hydraulic pressure for braking using Hydraulic Brake Assist (HBA) during auto stop engine shutdown is needed.

SUMMARY

The disclosure is generally directed to a hydraulic brake assist vacuum maintenance system. An illustrative embodiment of the system includes a vacuum source, a vacuum booster/master cylinder interfacing with the vacuum source, a brake pedal interfacing with the vacuum booster/master cylinder, a brake control unit interfacing with the vacuum booster/master cylinder, wheel brakes interfacing with the brake control unit and a hydraulic brake assist interfacing with the brake control unit and adapted to hydraulically operate the wheel brakes upon reduction or cessation of vacuum pressure from the vacuum source to the vacuum booster/master cylinder.

The disclosure is further generally directed to a hydraulic brake assist vacuum maintenance method for a vehicle having hydraulic brake assist. An illustrative embodiment of the method includes terminating operation of a vehicle engine of the vehicle and providing hydraulic pressure for braking of the vehicle using the hydraulic brake assist.

In some embodiments, the hydraulic brake assist vacuum maintenance method may include terminating operation of a vehicle engine of the vehicle; providing hydraulic pressure for braking of the vehicle using the hydraulic brake assist; determining whether braking of the vehicle is occurring; determining whether braking demand is being met if the braking of the vehicle is occurring; determining whether the vehicle is moving if the braking demand is not being met; determining braking pressure required to hold the vehicle on a grade if the vehicle is not moving; and applying braking pressure up to the braking demand but limited to a predetermined minimum level or level required to hold the vehicle on the grade.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
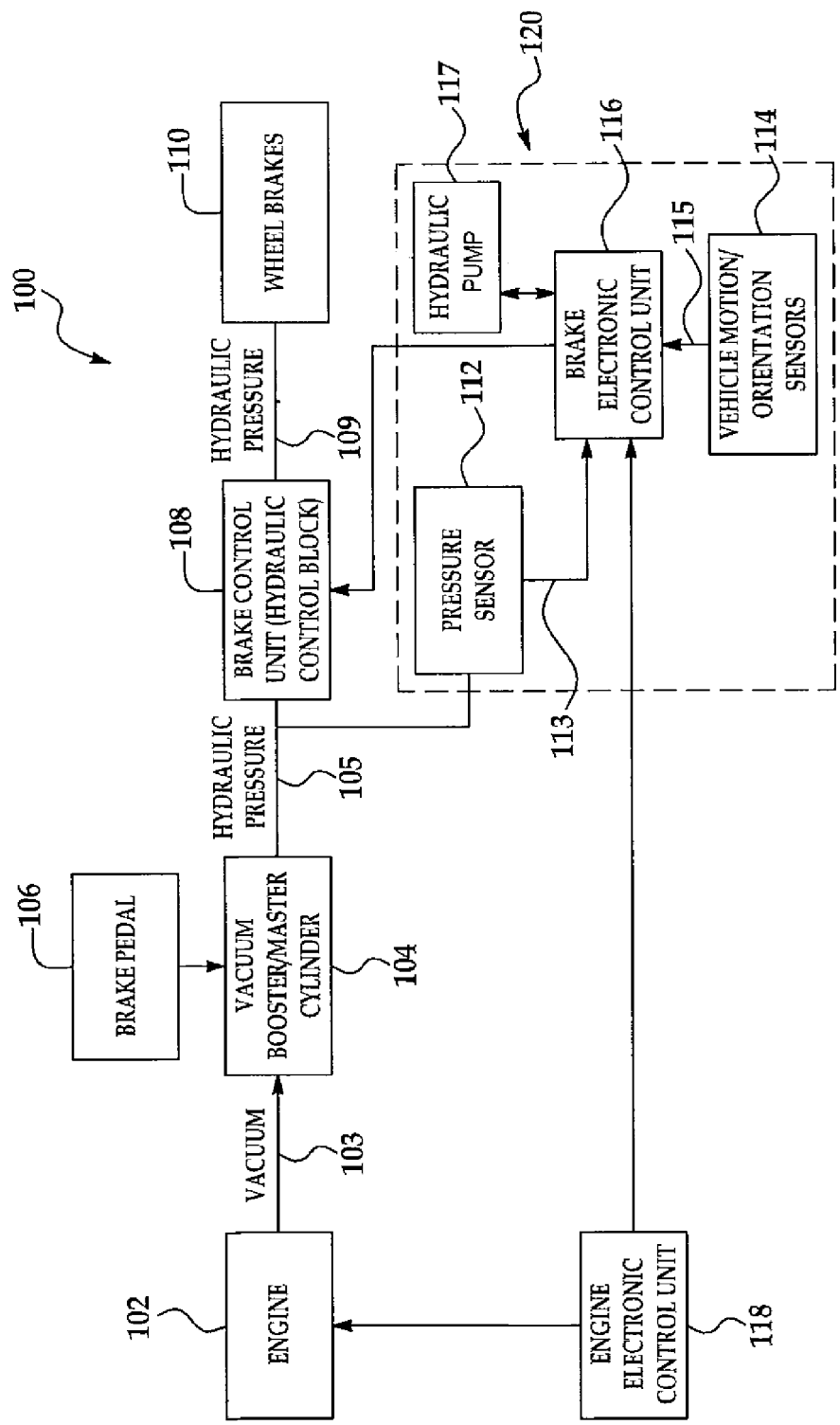
FIG. 1 is a block diagram of an illustrative embodiment of the hydraulic brake assist vacuum maintenance system.

Referring initially to FIG. 1, an illustrative embodiment of a hydraulic brake assist vacuum maintenance system, hereinafter system, is generally indicated by reference numeral 100. The system 100 may include a vehicle engine 102 of a vehicle. The vehicle engine 102 may be controlled by an engine electronic control unit 118. The vehicle engine 102 may provide vacuum pressure 103 to a vacuum booster/master cylinder 104. A brake pedal 106 may interface with the vacuum booster/master cylinder 104. Responsive to depression of the brake pedal 106, the vacuum booster/master cylinder 104 may provide hydraulic pressure 105 to a brake control unit or hydraulic control block 108, as is conventional in the art, where the hydraulic control block or brake control unit 108 includes at least one hydraulic pump and is controlled by an electronic control unit (controller), such as brake assist electronic control unit 116 which may further interface with engine control unit 118, and responsive to wheel speed sensors, to control a magnitude of hydraulic pressure provided to the wheel brakes. The brake control unit 108 may provide hydraulic pressure 109 to wheel brakes 110 of the vehicle to actuate the wheel brakes 110 and decelerate or stop the vehicle.

A Hydraulic Brake Assist (HBA) 120 may interface with the brake control unit 108. The HBA 120 may be conventional and may include a pressure sensor 112 which is adapted to measure the magnitude of the hydraulic pressure 105. The pressure sensor 112 may provide pressure sensor data 113 which indicates the hydraulic pressure 105 to a brake electronic control unit 116. Vehicle motion/orientation sensors 114 may be adapted to measure the motion and/or orientation of the vehicle and may provide motion/orientation data 115 to the brake electronic control unit 116. Through the brake control unit 108, the brake electronic control unit 116 (brake assist control unit) may control the magnitude of the hydraulic pressure 109 responsive to the pressure sensor data 113 and the motion/orientation data 115. The brake electronic control unit 116 of the HBA 120 may interface with the engine electronic control unit 118.

In exemplary application of the system 100, under driving conditions, the vehicle engine 102 is operated responsive to input from the engine electronic control unit 118. The vehicle engine 102 provides vacuum pressure 103 to the vacuum booster/master cylinder 104. Upon depression of the brake pedal 106, the vacuum booster/master cylinder 104 provides hydraulic pressure 105 to the brake control unit 108. In turn, the brake control unit 108 controls the magnitude of the hydraulic pressure 109 which is applied to the wheel brakes 110. Depending on the magnitude of the hydraulic pressure 109, the wheel brakes 110 decelerate or stop the vehicle.

During auto stop of the vehicle, the engine electronic control unit 118 terminates further operation of the vehicle engine 102. In the event of subsequent braking during the auto stop mode of the vehicle, the brake pedal 106 is depressed. In response, the vacuum booster/master cylinder 104 provides hydraulic pressure 105, reduced in magnitude due to the lack or absence of vacuum pressure 103 from the vehicle engine 102, to the brake control unit 108. The brake control unit 108 provides hydraulic pressure 109 of correspondingly reduced magnitude to the wheel brakes 110 of the vehicle.

The pressure sensor 112 of the HBA 120 monitors the hydraulic pressure 109 which is delivered from the brake control unit 108 to the wheel brakes 110. Simultaneously, the vehicle motion/orientation sensors 114 monitor the motion and orientation of the vehicle, including but not limited to motion which is imparted to the vehicle by any gradient on which the vehicle may rest. The brake electronic control unit 116 uses the pressure sensor data 113 from the pressure sensor 112 and the motion/orientation data 115 from the vehicle motion/orientation sensors 114 to augment the magnitude of the hydraulic pressure 109 which is applied to the wheel brakes 110 depending on the braking needs of the vehicle. Accordingly, the HBA 120 provides boosted hydraulic pressure 109 via a hydraulic pump and motor 117 and the brake control unit 108. Upon resumption of driving conditions, the engine electronic control unit 118 operates the vehicle engine 102. The vehicle engine 102 provides vacuum pressure 103 to the vacuum booster/master cylinder 104 and the brake control unit 108 actuates the wheel brakes 110 of the vehicle in the conventional manner responsive to depression of the brake pedal 106.

In some applications, NVH (Noise, Vibration and Harshness) may result due to the pump noise which is inherent in operation of the HBA 120. The NVH can be attenuated or managed through the use of limited pressure control which could be limited as a function of grade detection, rolling information or open loop max pressure control, for example and without limitation.

Figure 2:
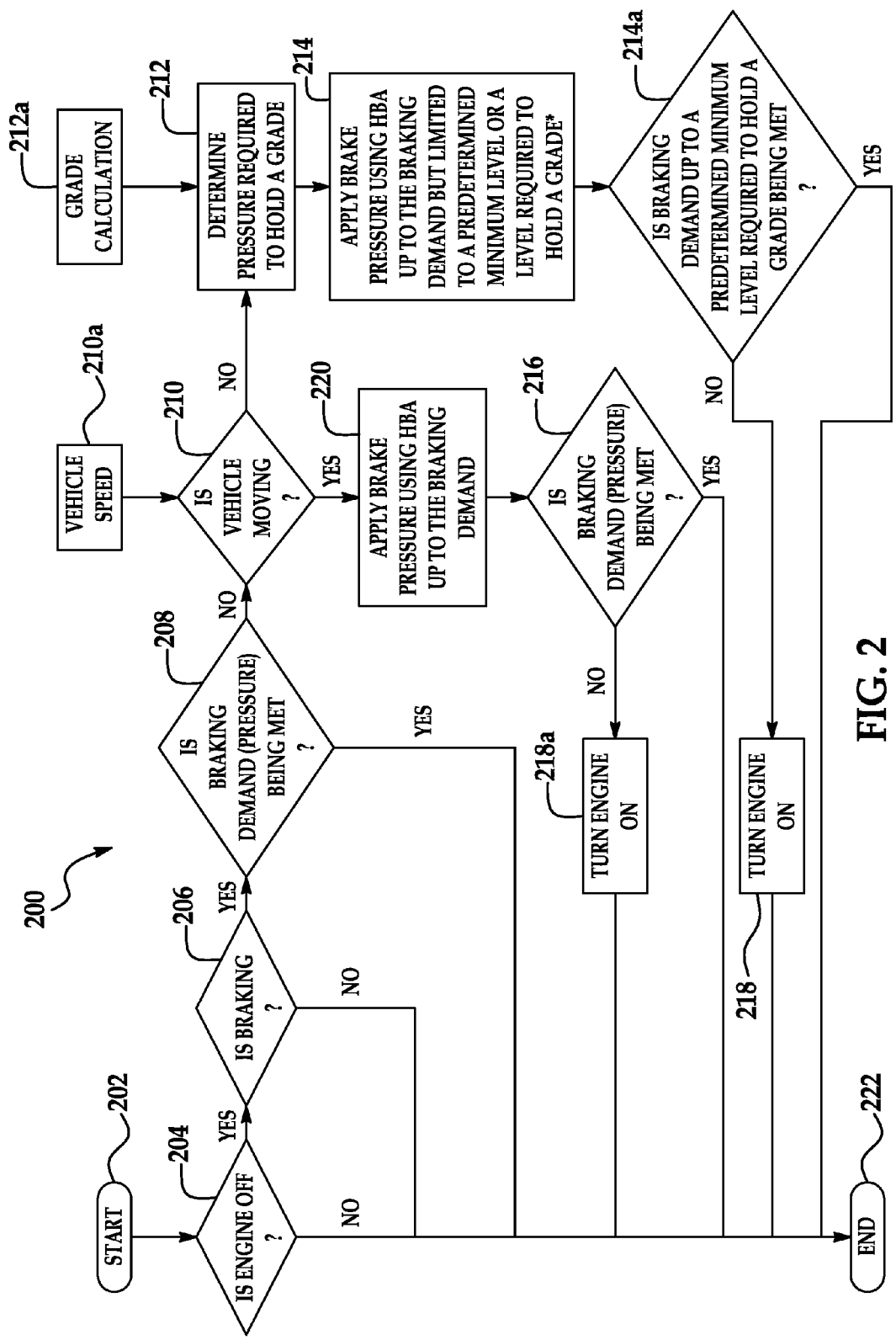
FIG. 2 is a flow diagram of an illustrative embodiment of the hydraulic brake assist vacuum maintenance method.

Referring next to FIG. 2, a flow diagram 200 of an illustrative embodiment of the hydraulic brake assist vacuum maintenance method is shown. The method 200 begins at block 202. In block 204, a determination may be made as to whether the vehicle engine is on or off. If the vehicle engine is not off, the method may end at block 222. If the vehicle engine is off, a determination may be made as to whether vehicle braking is occurring in block 206. If braking is not occurring, the method may end at block 222. If braking is occurring, a determination may be made as to whether braking demand or pressure is being met (block 208). If braking demand or pressure is being met, the method may end at block 222. If braking demand or pressure is not being met, a determination may be made as to whether the vehicle is moving (block 210). In some applications, this may include a determination of vehicle speed 210a.

If the outcome of the determination made at block 210 indicates that vehicle is not moving, the brake pressure which is required to hold the vehicle on a grade may be determined (block 212) based on a grade calculation 212a. In block 214, brake pressure may be applied using an HBA (Hydraulic Brake Assist) of the vehicle up to the braking demand but limited to a predetermined minimum level or a level required to hold the grade. In block 214a, a determination may be made as to whether the braking demand up to a predetermined minimum level which is required to hold the grade is being met. If the braking demand or pressure is being met, the method may end at block 222. If the braking demand or pressure is not being met, the vehicle engine may be turned on at block 218 and the method may then end at block 222.

If the outcome of the determination made at block 210 indicates that the vehicle is moving, brake pressure up to the braking demand may be applied using the HBA (Hydraulic Brake Assist) of the vehicle in block 220. In block 216, a determination may be made as to whether the braking demand or pressure is being met. If the braking demand or pressure is being met, the method may end at block 222. If the braking demand or pressure is not being met, the vehicle engine may be turned on at block 218a and the method may then end at block 222.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A vehicle hydraulic brake system, comprising:
a hydraulic brake assist apparatus comprising a brake assist electronic control unit, the hydraulic brake assist apparatus and the brake assist electronic control unit configured to provide an additional source of hydraulic pressure using a hydraulic pump to hydraulically operate wheel brakes of the vehicle upon reduction or cessation of generation of vacuum pressure by a source of vacuum pressure
the source of vacuum pressure used to provide a first source of hydraulic pressure to operate the wheel brakes, the source of vacuum pressure comprising an engine within the vehicle, and the vacuum pressure from said source of vacuum pressure provided to a brake control unit, the brake control unit comprising said hydraulic pump for interfacing with said brake assist electronic control unit, the brake assist electronic control unit comprising memory storing computer program instructions and at least one processor configured to execute the computer program instructions, the at least one processor configured to provide the first source of hydraulic pressure to the wheel brakes at a first selected magnitude,
the additional source of hydraulic pressure provided to the wheel brakes through the brake control unit, the brake assist electronic control unit configured to augment the first source of hydraulic pressure in response to sensing a reduction or cessation of the first source of hydraulic pressure, the additional source of hydraulic pressure provided by controlling the brake control unit to control a magnitude of said additional source of hydraulic pressure provided to the wheel brakes.

2. The system of claim 1 further comprising:
a vacuum booster/master cylinder interfacing with said source of vacuum pressure, said vacuum booster/master cylinder configured to provide the first source of hydraulic pressure;
a brake pedal interfacing with said vacuum booster/master cylinder;
the brake control unit interfacing with said vacuum booster/master cylinder; and
the wheel brakes interfacing with said brake control unit.

3. The system of claim 2 wherein the at least one electronic control unit comprises an engine electronic control unit interfacing with said vehicle engine.

4. The system of claim 2 wherein the at least one electronic control unit comprises said brake assist electronic control unit interfacing with said engine electronic control unit.

5. The system of claim 4 wherein said hydraulic brake assist apparatus further comprises a pressure sensor interfacing with said brake assist electronic control unit and the at least one input and output of said brake control unit.

6. The system of claim 4 wherein said hydraulic brake assist apparatus further comprises vehicle motion/orientation sensors interfacing with said brake assist electronic control unit.

7. The system of claim 2 wherein said hydraulic brake assist apparatus further comprises said brake assist electronic control unit interfacing with said brake control unit, said hydraulic brake system further comprising an engine electronic control unit interfacing with said brake assist electronic control unit and said source of vacuum pressure.

8. The system of claim 7 further comprising a pressure sensor interfacing with at least one of the at least one input and output of said brake control unit and said brake assist electronic control unit.

9. The system of claim 1, wherein said hydraulic brake assist apparatus is configured to provide the additional source of hydraulic pressure upon shut-down of a vehicle engine, the vehicle engine configured to provide the source of vacuum pressure.

10. The system of claim 1, wherein said vehicle hydraulic brake system is configured to determine whether braking of the vehicle is occurring.

11. The system of claim 10, wherein said vehicle hydraulic brake system is configured to determine whether a braking demand is being met if said braking of the vehicle is occurring.

12. The system of claim 11, wherein said hydraulic brake assist apparatus is configured to apply the additional hydraulic brake pressure up to said braking demand if said braking demand is not being met.

13. The system of claim 12, wherein said vehicle hydraulic brake system is configured to further determine whether said braking demand is being met following application of the additional hydraulic brake pressure.

14. The system of claim 13, wherein said vehicle hydraulic brake system is configured to operate the source of vacuum pressure if said braking demand is not being met.

15. The system of claim 12, wherein said vehicle hydraulic brake system is configured to determine, if the vehicle is not moving, a level of hydraulic pressure required by said hydraulic brake assist apparatus to maintain the vehicle in place.

16. The system of claim 15, wherein said vehicle hydraulic brake system comprises a grade calculator and is configured to determine a grade the vehicle is on and the level of hydraulic pressure required.

17. The system of claim 15, wherein said vehicle hydraulic brake system is configured to determine whether the level of hydraulic pressure required is being met.

18. The system of claim 17, wherein said vehicle hydraulic brake system is configured to operate the source of vacuum pressure if the level of hydraulic pressure required is not being met.

19. A vehicle hydraulic brake comprising:
a vacuum source comprising a vehicle engine;
a vacuum booster/master cylinder interfacing with said vacuum source, said vacuum booster/master cylinder configured to provide a primary source of hydraulic pressure;
a brake pedal interfacing with said vacuum booster/master cylinder;
a brake control unit interfacing with said vacuum booster/master cylinder, the brake control unit comprising at least one hydraulic pump and interfacing with at least one electronic control unit, the at least one electronic control unit comprising memory storing computer program instructions and at least one processor configured to execute the computer program instructions, the at least one processor configured to provide the primary source of hydraulic pressure to the wheel brakes at a first selected magnitude;
wheel brakes interfacing with said brake control unit; and,
a hydraulic brake assist apparatus controlled by a brake assist electronic control unit comprising the at least one electronic control unit, the hydraulic brake assist apparatus configured to provide a secondary source of hydraulic pressure using said hydraulic pump to hydraulically operate the wheel brakes of the vehicle upon reduction or cessation of generation of vacuum pressure from the vacuum source, the vacuum source used to provide the primary source of hydraulic pressure, the primary source of hydraulic pressure and the secondary source of hydraulic pressure provided to the wheel brakes through the brake control unit, the brake assist electronic control unit configured to augment the primary source of hydraulic pressure in response to sensing a reduction or cessation of the primary source of hydraulic pressure with the secondary source of hydraulic pressure by controlling the brake control unit to control a second selected magnitude of said hydraulic pressure provided from said primary or said secondary source of hydraulic pressure to the wheel brakes.

\* \* \* \* \*